US011875721B2

(12) United States Patent
Zhang et al.

(10) Patent No.: US 11,875,721 B2
(45) Date of Patent: Jan. 16, 2024

(54) DISPLAY PANEL AND DRIVING METHOD THEREOF

(71) Applicant: TCL China Star Optoelectronics Technology Co., Ltd., Guangdong (CN)

(72) Inventors: Yonglei Zhang, Guangdong (CN); Tao He, Guangdong (CN); Jhenwei He, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 269 days.

(21) Appl. No.: 17/263,954

(22) PCT Filed: Dec. 23, 2020

(86) PCT No.: PCT/CN2020/138473
§ 371 (c)(1),
(2) Date: Jan. 28, 2021

(87) PCT Pub. No.: WO2022/116310
PCT Pub. Date: Jun. 9, 2022

(65) Prior Publication Data

US 2022/0398964 A1 Dec. 15, 2022

(30) Foreign Application Priority Data

Dec. 1, 2020 (CN) ......................... 202011385271.5

(51) Int. Cl.
*G09G 3/20* (2006.01)

(52) U.S. Cl.
CPC ... *G09G 3/2074* (2013.01); *G09G 2310/0254* (2013.01); *G09G 2310/0278* (2013.01); *G09G 2320/0271* (2013.01)

(58) Field of Classification Search
CPC ......... G09G 3/2074; G09G 2310/0254; G09G 2310/0278; G09G 2320/0271
See application file for complete search history.

(56) References Cited

U.S. PATENT DOCUMENTS

| | | | | |
|---|---|---|---|---|
| 2015/0123961 | A1* | 5/2015 | Park | G09G 3/3614 345/212 |
| 2018/0108307 | A1 | 4/2018 | Sakurai | |
| 2018/0203319 | A1* | 7/2018 | Yamazaki | G02F 1/133514 |

FOREIGN PATENT DOCUMENTS

| | | |
|---|---|---|
| CN | 108109596 | 6/2018 |
| CN | 109671409 | 4/2019 |
| CN | 110310609 | 10/2019 |
| CN | 111028812 | 4/2020 |
| CN | 111474791 | 7/2020 |
| CN | 111540324 | 8/2020 |
| CN | 112086079 | 12/2020 |
| KR | 10-2015-0144897 | 12/2015 |

* cited by examiner

*Primary Examiner* — Hang Lin

(57) ABSTRACT

The application provides a display panel and a driving method thereof. The display panel comprises a plurality of sub-pixels arranged in a matrix, and the sub-pixels are grouped into a plurality of cell areas arranged repeatedly along the row direction and the column direction. Each cell area comprises at least two sub-pixels, with polarities of adjacent sub-pixels opposite to each other. For at least two consecutive frames during a display cycle, the gray-levels of sub-pixels in the cell area maintain unchanged while polarities of the sub-pixels are reversed.

16 Claims, 3 Drawing Sheets

DISPLAY PANEL AND DRIVING METHOD THEREOF

RELATED APPLICATIONS

This application is a National Phase of PCT Patent Application No. PCT/CN2020/138473 having International filing date of Dec. 23, 2020, which claims the benefit of priority of Chinese Patent Application No. 202011385271.5 filed on Dec. 1, 2020. The contents of the above applications are all incorporated by reference as if fully set forth herein in their entirety.

FIELD AND BACKGROUND OF THE INVENTION

The application relates to display, in particular to a display panel and a driving method thereof.

As the requirement for display quality increases, improvement for display quality at large view angle has become a major direction to develop.

Conventional display panels render quality display at large view angle by switching the sub-pixels between high gray-levels and low gray-levels, wherein the gray-levels of the sub-pixels are switched simultaneously with the polarities of the sub-pixels. Consequently, when a frame is switched, the polarities of sub-pixels may lose symmetricity and cause grainy effects which considerably reduce display quality of the display panel.

Therefore, a new display panel and a driving method thereof are desirable to solve such technical problems.

The present application provides a display panel and a driving method thereof, endeavored to solve the described display quality problem, that is, the grainy effects induced by polarity asymmetricity of sub-pixels caused by switching the gray-levels simultaneously with polarity reversions of the sub-pixels in a conventional display panel.

SUMMARY OF THE INVENTION

An embodiment of a display panel is provided, comprising the following features.

A plurality of sub-pixels are arranged in a matrix, grouped into a plurality of cell areas arranged repeatedly in rows and columns. Each of the cell areas comprises at least two of the sub-pixels.

A plurality of scanlines are provided for transmitting scan signals to each sub-pixel, wherein each row of the sub-pixels corresponds to one of the scanlines.

A plurality of data lines are provided for transmitting data signals to each sub-pixel, wherein at least one data line is arranged between every two adjacent columns of sub-pixels.

Wherein, polarities of adjacent sub-pixels in each cell area are opposite. For at least two consecutive frames during one display cycle, gray-levels of sub-pixels in each cell area maintain unchanged whereas polarities of sub-pixels in each cell area are changed in successive frames.

In an embodiment of the display panel provided by the application, during one display cycle, polarities of each sub-pixel in each cell area in a second frame may be opposite to that in a first frame, and gray-levels of each sub-pixel in the second frame may be respectively identical to that in the first frame.

Alternatively, polarities of each sub-pixel in each cell area in the second frame may be opposite to that of a third frame, and gray-levels of each sub-pixel in the second frame may be respectively identical to that in the third frame.

In an embodiment of the display panel provided by the application, during one display cycle, polarities of each sub-pixel in each cell area in the third frame may be opposite to that of a fourth frame, and gray-levels of each sub-pixel in the third frame are respectively identical to that in the fourth frame.

Alternatively, gray-levels of each sub-pixel in the fourth frame may be respectively identical to that in the first frame.

In an embodiment of the display panel provided by the application, each of the sub-pixels may be either a high gray-level sub-pixel or a low gray-level sub-pixel. Each cell area may be arranged with a first sub-pixel, and a second sub-pixel adjacent to the first sub-pixel. The first sub-pixel and the second sub-pixel may have different gray-levels.

In an embodiment of the display panel provided by the application, the first and second sub-pixels among the sub-pixels may be distributed in rows or columns, and a number of first sub-pixels are respectively identical to a number of second sub-pixels.

In an embodiment of the display panel provided by the present application, during one display cycle, a gray-level of the first sub-pixel may be switched in an order of high, high, and low; and a gray-level of the second sub-pixel may be switched in an order of low, low, and high.

Alternatively, the gray-level of the first sub-pixel may be switched in an order of high, low, and low; and the gray-level of the second sub-pixel may be switched in an order of low, high, and high.

In an embodiment the display panel provided by the present application, during one display cycle, a gray-level of the first sub-pixel may be switched in an order of high, high, low, and low; and a gray-level of the second sub-pixel may be switched in an order of low, low, high, and high.

Alternatively, the gray-level of the first sub-pixel may be switched in an order of high, low, low, and high; and the gray-level of the second sub-pixel may be switched in an order of low, high, high, and low.

In an embodiment of a display panel provided by the application, the first sub-pixel renders brightness in the first and second frames greater than a first target brightness of the first sub-pixel during one display cycle. The first sub-pixel renders brightness in the third and fourth frames lower than the first target brightness of the first sub-pixel during one display cycle. The second sub-pixel renders brightness in the first and second frames lower than a second target display brightness of the second sub-pixel during one display cycle. The second sub-pixel renders brightness in the third and fourth frames greater than the second target display brightness of the second sub-pixel during one display cycle.

In another embodiment of the display panel provided by the application, the first sub-pixel renders brightness in the first and fourth frames greater than a first target display brightness of the first sub-pixel during one display cycle. The first sub-pixel renders brightness in the second and third frames less than the first target display brightness of the first sub-pixel during one display cycle.

The second sub-pixel renders brightness in the first and fourth frames lower than a second target display brightness of the second sub-pixel during one display cycle, and the second sub-pixel renders brightness in the second and third frames greater than the second target display brightness of the second sub-pixel during one display cycle.

In a further embodiment of the display panel provided by the application, wherein in a cell area, the data lines comprise first sub-data lines and second sub-data lines. Each of the first sub-pixels is electrically connected to one of the first sub-data lines. Each of the second sub-pixels is electrically connected to one of the second sub-data lines. The first sub-data lines and the second sub-data lines are alternately arranged, and polarities of the first sub-data lines and the second sub-data lines are opposite.

In an embodiment of the display panel provided by the application, in each of the cell areas, two first sub-pixels in adjacent columns share one first sub-data line, and two second sub-pixels in adjacent columns share one second sub-data line.

In a further embodiment of the display panel provided by the application, during one display cycle, a polarity of the first sub-data lines is switched in an order of positive, negative, positive, and negative. A polarity of the second sub-data lines is switched in an order of negative, positive, negative, and positive.

In a further embodiment of the display panel provided by the application, the display panel further comprises an output circuit board, and the output circuit board comprises at least two output terminals.

The output terminal may comprise a first sub-output terminal and a second sub-output terminal. The first sub-output terminal may be electrically connected to at least one first sub-data line. The second sub-output terminal may be electrically connected to at least one second sub-data line.

In an embodiment of the display panel provided by the application, a refresh rate of a displayed image on the display panel is greater than or equal to 240 Hz.

In one embodiment of the display panel provided by the application, the sub-pixels comprise red sub-pixels, green sub-pixels, and blue sub-pixels. The sub-pixels are repeatedly arranged in each row in an order of red, green, and blue. The sub-pixels in the same column are of the same color.

A further embodiment of the application also provides a driving method for a display panel, which comprises the following steps.

A plurality of sub-pixels are arranged in a matrix to form a plurality of cell areas arranged repeatedly in rows and columns. Each of the cell areas comprises at least two sub-pixels. Polarities of adjacent sub-pixels in the cell areas are opposite. For at least two consecutive frames during one display cycle, gray-levels of sub-pixels in each cell area maintain unchanged whereas polarities of sub-pixels in each cell area are changed in successive frames.

A scan signal is transmitted to each sub-pixel through a plurality of scanlines, wherein each row of the sub-pixel corresponds to one of the scanlines.

In an embodiment of the driving method of the display panel provided by the application, during one display cycle, polarities of each sub-pixel in each cell area in a second frame may be opposite to that in a first frame, and gray-levels of each sub-pixel in the second frame may be respectively identical to that in the first frame.

Alternatively, polarities of each sub-pixel in each cell area in the second frame may be opposite to that of a third frame, and gray-levels of each sub-pixel in the second frame may be respectively identical to that in the third frame.

In a further embodiment of the driving method of the display panel provided by the application, a first sub-pixel and a second sub-pixel adjacent to the first sub-pixel are arranged in each cell area. The first sub-pixel is electrically connected to a first sub-data line. The second sub-pixel is electrically connected to a second sub-data line. The first sub-data line and the second sub-data line are alternately arranged. Polarities of the first sub-data line and the second sub-data line are opposite.

In a further embodiment of the driving method of the display panel provided by the application, during one display cycle, a polarity of the first sub-data line may be switched in an order of positive, negative, positive, and negative, so that a polarity of the first sub-pixel are switched in the order of positive, negative, positive, and negative.

A polarity of the second sub-data line may be switched in an order of negative, positive, negative, and positive, so that a polarity of the second sub-pixel are switched in the order of negative, positive, negative, and positive.

In an embodiment of the driving method of the display panel provided by the application, in each of the cell areas, two first sub-pixels in adjacent columns share one first sub-data line, and two second sub-pixels in adjacent columns share one second sub-data line.

Beneficial effect: According to the embodiments of the application, the sub-pixels in a cell area maintain the same gray-level for at least two consecutive frames during a display cycle, with polarities reversed during frame switching. In this way, the polarities of sub-pixels in the display panel are maintained symmetrical during frame switching, thereby the grainy effects in the displayed image can be prevented, and hence improving the display quality of the display panel.

BRIEF DESCRIPTION OF THE SEVERAL VIEWS OF THE DRAWINGS

The technical solution and other beneficial effects of the application will be obvious through the detailed description of the specific implementation mode of the application in combination with the attached drawings.

DESCRIPTION OF SPECIFIC EMBODIMENTS ON THE INVENTION

Figure 1:
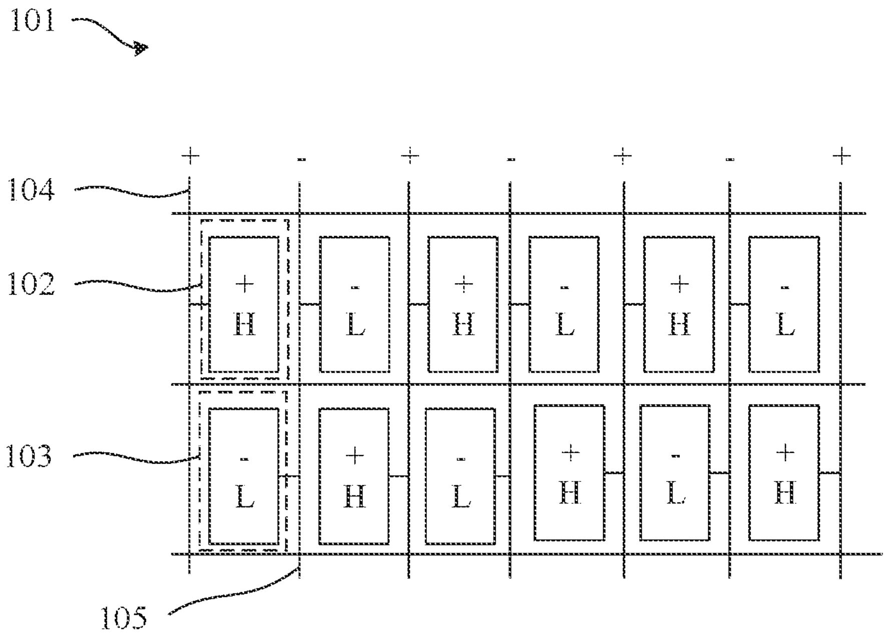
FIG. 1 is a structural diagram of a cell area of the display panel at the first frame according to an embodiment of the application.

The application provides a driving circuit board and a driving method thereof. In order to make the purpose, technical scheme, and effect of the application clearer and more definite, the application is further described in detail with reference to the attached drawings and examples. It should be understood that the specific embodiments described herein are for the purpose of explaining the present application and are not intended to limit the present application.

In a conventional display panel, the gray-levels of sub-pixels are switched between a high level and a low level simultaneously when the polarity of the sub-pixels are switched. This causes polarity asymmetricity between sub-pixels during frame switching, rendering graininess on a displayed image which further affects the display quality of the display panel. Based on this, the application proposes a display panel and a driving method thereof.

Referring to FIGS. 1 to 5, a display panel comprises a plurality of sub-pixels arranged in a matrix. The sub-pixels are grouped into a plurality of cell areas 101 arranged repeatedly in rows and columns. Each of the cell areas 101 comprises at least two of the sub-pixels.

A plurality of scanlines are arranged to transmit scan signals to each sub-pixel, each corresponding to one row of the sub-pixels.

A plurality of data lines are arranged to transmit data signals for each sub-pixel, and at least one data line is arranged between sub-pixels in two adjacent columns.

Wherein, the polarities of adjacent sub-pixels in the cell area 101 are respectively opposite to each other. For at least two consecutive frames during one display cycle, gray-levels of any one of the sub-pixels in the cell area 101 maintain unchanged, with polarities of each sub-pixel reversed in successive frames.

According to an embodiment of the application, each sub-pixel in the cell area has their gray-level unchanged for at least two consecutive frames during a display cycle, with polarities of each sub-pixel changed in successive frames. In this way, the polarities of the sub-pixels in the display panel are symmetrical during frame switching, thus eliminating the grainy effects in the displayed image, and improving the display quality of the display panel.

The technical scheme of the application is described in combination with specific embodiments below.

Referring to FIGS. 1 to 5, each of the sub-pixels is either a high gray-level sub-pixel or a low gray-level sub-pixel. In a cell area 101, a first sub-pixel 102 is arranged with a second sub-pixel 103 adjacent to the first sub-pixel 102.

The gray-level of the first sub-pixel 102 is different from that of the second sub-pixel 103.

For example, as shown in FIGS. 1 to 4, if a sub-pixel at the first row first column is of high gray-level, the adjacent sub-pixels at the first row second column, and the second row first column, are of low gray-level.

In this embodiment, each of the cell areas 101 may comprise 2M sub-pixels distributed in rows and/or columns, wherein, the number of the first sub-pixels 102 is 1M, and the number of the second sub-pixels 103 is also 1M, and M is a positive integer. M may represent a number of rows of the sub-pixels within the cell area 101, or a number of columns of the sub-pixels within the cell area 101. In a case wherein the cell areas 101 are distributed in rows, M represents the number of columns of sub-pixels in each cell area 101. In the case wherein the cell areas 101 are distributed in columns, M represents the row number of sub-pixels in each cell area 101.

For example, when M is 1, the number of the sub-pixels in a cell area 101 is 2, wherein the number of the first sub-pixel 102 is 1 and the number of the second sub-pixel 103 is 1.

Figure 2:
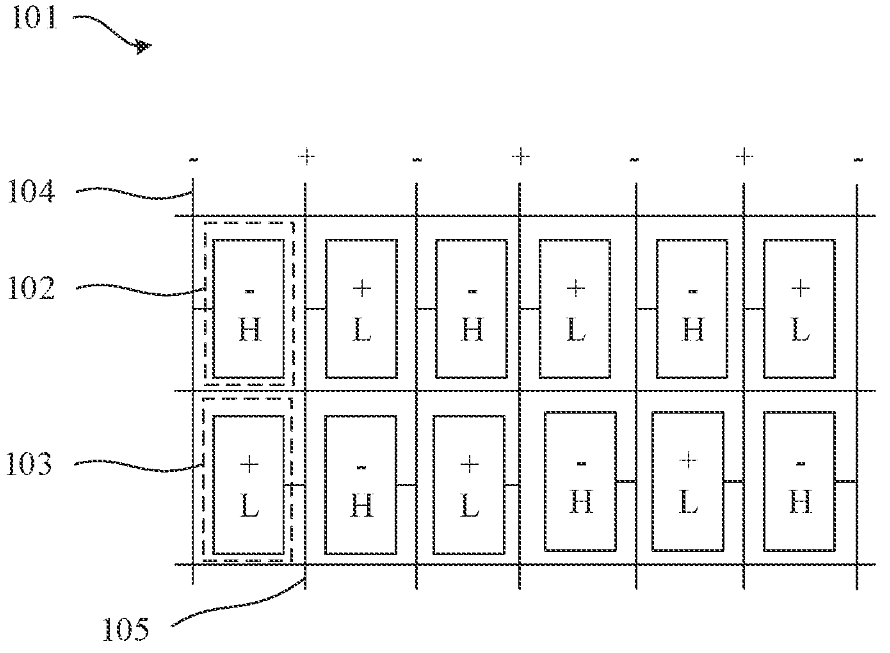
FIG. 2 is a structural diagram of the cell area of the display panel at the second frame according to an embodiment of the application.

Referring to FIG. 1 and FIG. 2, in a cell area 101 during one display cycle, the polarities of each sub-pixels in the first frame are reversed in the second frame, and the gray-levels of the sub-pixels in the second frame maintain unchanged as in the first frame.

Alternatively, during one display cycle, the polarities of each sub-pixel in the cell area 101 in the second frame are reversed in the third frame, and the gray-levels of the sub-pixels in the second frame maintain unchanged in the third frame.

In the present embodiment, a displayed image of the display panel can be switched between three or four frames during one display cycle.

When the displayed image of the display panel switches three frames during one display cycle, the gray-level of the first sub-pixel 102 is switched in an order of high, high, and low; and the gray-level of the second sub-pixel 103 is switched in an order of low, low, and high. Meanwhile, the duration in the third frame may be greater than that in the first frame and the second frame during the display cycle.

Alternatively, the gray-level of the first sub-pixel 102 can be switched in an order of high, low, and low; and the gray-level of the second sub-pixel 103 can be switched in an order of low, high, and high. Meanwhile, the duration in the first frame may be greater than that in the second frame and the third frame during the display cycle.

Figure 3:
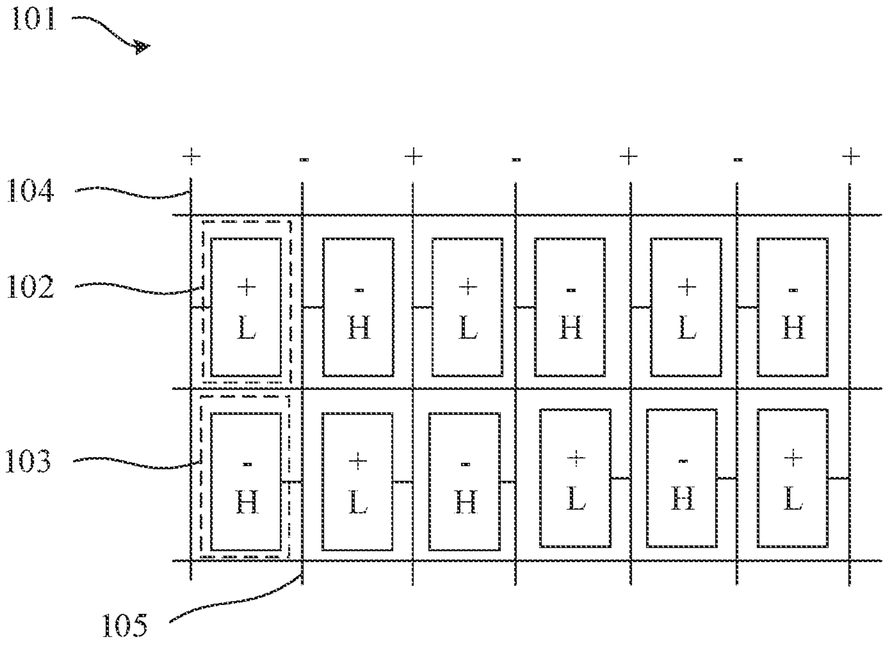
FIG. 3 is a structural diagram of the cell area of the display panel at the third frame according to an embodiment of the application.
Figure 4:
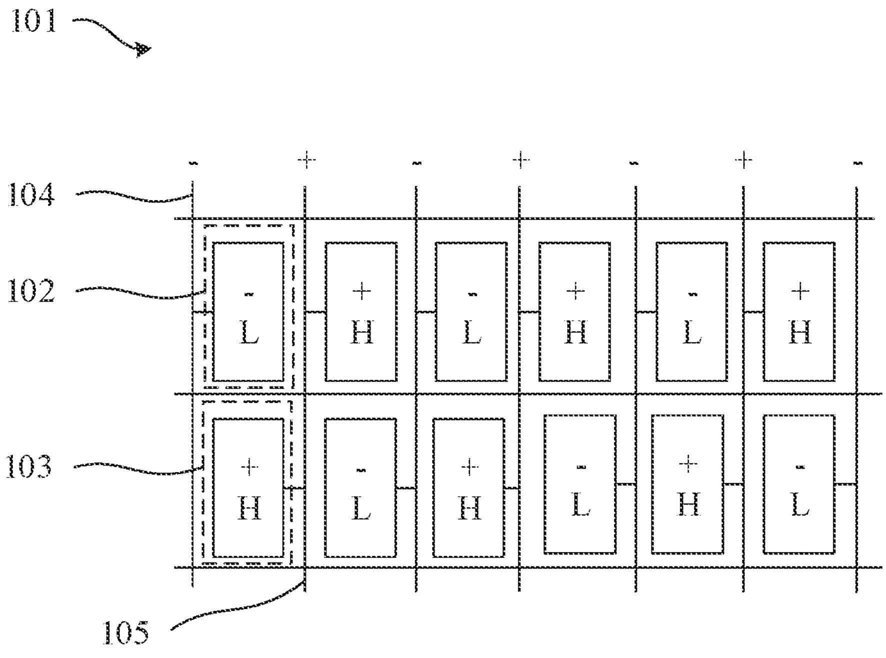
FIG. 4 is a structural diagram of the cell area of the display panel at the fourth frame according to an embodiment of the application.

Referring to FIG. 3 and FIG. 4, during one display cycle, the polarities of each sub-pixel in the cell area 101 in the fourth frame are reversed to be opposite to those in the third frame; and the gray-level of the sub-pixels in the third frame maintain unchanged in the fourth frame.

Alternatively, during one display cycle in the cell area 101, the polarities of the sub-pixels in the fourth frame are reversed from those in the third frame, and the gray-levels of the sub-pixels in the fourth frame maintain identical to those in the first frame.

For example, during a display cycle, the polarity of the first sub-pixel 102 is changed from the first frame to the fourth frame in an order of positive, negative, positive, and negative. Meanwhile, since the polarity of the second sub-pixel 103 is opposite to that of the first sub-pixel 102, the polarity of the second sub-pixel 103 is changed from the first frame to the fourth frame during the display cycle in an order of negative, positive, negative, and positive.

In an preferred embodiment, during one display cycle in the cell area 101, each of the sub-pixels in the second frame has a polarity opposite to that in the first frame, and the gray-levels of the sub-pixels in the second frame maintain unchanged and is identical to those in the second frame. Meanwhile, each of the sub-pixels in the fourth frame carries a polarity opposite to that in the third frame, and the gray-levels of the sub-pixels in the third frame maintain unchanged and are respectively identical to those in the second frame. Same example is also applicable to gray-levels of the sub-pixels in the fourth frame. Meanwhile, during frame switching, the polarity symmetricity is maintained throughout the first frame to the second frame, and the third frame to the fourth frame, producing an advantageous condition for eliminating the grainy effects in the displayed imaged on the display panel.

Referring to FIGS. 1 through 5, where H denotes high gray-level and L denotes low gray-level. During one display cycle, the gray-level of the first sub-pixel 102 is switched in an order of high, high, low, and low, and the gray-level of the second sub-pixel 103 is switched in the order of low, low, high, and high.

Alternatively, during the display cycle, the gray-level of the first sub-pixel 102 is switched in an order of high, low, low, and high; and the gray-level of the second sub-pixel 103 is switched in an order of low, high, high, and low.

Figure 5:
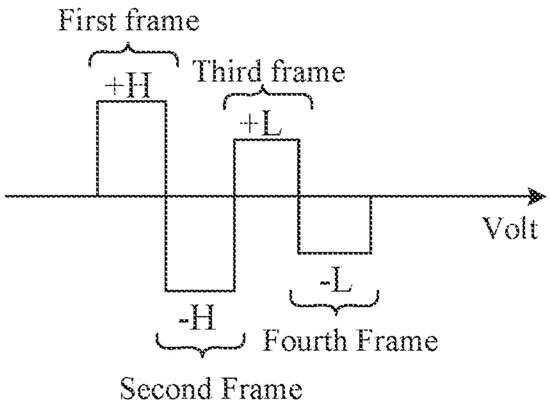
FIG. 5 shows the polarity and gray-level of the first sub-pixel during one display cycle.

Referring to FIG. 5, in the embodiment, from the first frame to the fourth frame during a display cycle, the polarity of the first sub-pixel 102 changes in an order of positive, negative, positive, and negative, and the gray-level of the first sub-pixel 102 changes in an order of high, high, low, and low. The first sub-pixel 102 in the first frame and the second frame renders brightness greater than a first target display brightness of the first sub-pixel 102 during the display cycle, and the first sub-pixel 102 in the third frame and the fourth frame renders brightness lower than the first target display brightness of the first sub-pixel 102 during the display cycle. From the first frame to the fourth frame during one display cycle, the gray-level of the first sub-pixel 102 changes in an order of high, low, low, and high; the first sub-pixel 102 in the first frame and the fourth frame renders brightness greater than a first target display brightness of the first sub-pixel 102 during the display cycle. The first sub-pixel 102 in the second frame and the third frame renders brightness lower than the first target display brightness of the first sub-pixel 102 during the display cycle.

Similarly, from the first frame to the fourth frame during a display cycle, the polarity of the second sub-pixel 103 is changed in an order of negative, positive, negative, and positive; and the gray-level of the second sub-pixel 103 is changed in an order of low, low, high, and high. In the first frame and the second frame, the second sub-pixel 103 renders brightness lower than a second target display brightness of the second sub-pixel 103 during the display cycle, and in the third frame and the fourth frame, the second sub-pixel 103 renders brightness greater than the second target display brightness of the second sub-pixel 103 during the display cycle. The gray-level of the second sub-pixel 103 is changed in an order of low, high, high, and low. In the first frame and the fourth frame, the second sub-pixel 103 renders brightness lower than the second target display brightness of the second sub-pixel 103 during the display cycle. In the second frame and the third frame, the sub-pixel 103 renders brightness greater than the second target display brightness of the second sub-pixel 103 during the display cycle.

Referring to FIGS. 1 to 4, the data lines comprise first sub-data lines 104 and second sub-data lines 105. In one cell area 101, a first sub-pixel 102 is electrically connected to a first sub-data line 104, a second sub-pixel 103 is electrically connected to a second sub-data line 105, and the first sub-data line 104 and the second sub-data line 105 are alternatively arranged in the cell area 101.

The polarity of the first sub-data line 104 is opposite to the polarity of the second sub-data line 105.

Referring to FIGS. 1 to 4, wherein the minus sign "–" indicates negative polarity and the plus sign "+" indicates positive polarity. During one display cycle, the polarity of the first sub-data line 104 is switched in an order of positive, negative, positive, and negative.

The polarity of the second sub-data line 105 switches in an order of negative, positive, negative, and positive.

For example, from the first frame to the fourth frame during a display cycle, the polarity of the first sub-pixel 102 changes in an order of positive, negative, positive, and negative; the polarity of the first sub-data line 104 is also switched in the order of positive, negative, positive, and negative.

Similarly, from the first frame to the fourth frame during a display cycle, the polarity of the second sub-pixel 103 is switched in an order of negative, positive, negative, and positive; the polarity of the second sub-data line 105 is also switched in the order of negative, positive, negative, and positive.

In the embodiment, since four frames are switched during one display cycle, and the brightness of the displayed image of the display panel from the first frame to the fourth frame is not equal, to avoid flicker, the refresh rate of the displayed image of the display panel is designed to be greater than or equal to 240 Hz.

Referring to FIGS. 1 to 4, in the cell area 101, two first sub-pixels 102 in adjacent columns share the same first sub-data line 104, and two second sub-pixels 103 in adjacent columns share the same second sub-data line 105.

In the present embodiment, a data line can be arranged between two adjacent columns of sub-pixels in the cell area 101.

For example, the data line located on the side of sub-pixels in the second column close to the sub-pixels in the first column may be a second sub-data line 105, electrically connected to the second sub-pixel 103 in the first and second columns. The data line located on the side of sub-pixels in the second column close to the sub-pixels in the third column, may be a first sub-data line 104 electrically connected to the first sub-pixels 102 in the second and third columns.

Through the configuration that the first sub-pixel 102 in two adjacent columns shares one first sub-data line 104, and the second sub-pixel 103 in two adjacent columns shares one second sub-data line 105, the number of data lines in the display panel can be reduced to simplify the structure of the display panel.

Meanwhile, the display panel of the embodiment controls the polarity of the first sub-pixel 102 through the first sub-data line 104, and the second sub-data line 105 controls the polarity of the second sub-pixel 103, wherein the polarity of the first sub-data line 104 is opposite to that of the second sub-data line 105, allowing the display panel to implement single point inversion in the row direction and the column direction, beneficial to reduce the grainy effects of the displayed image, so that the display quality of the display panel is improved.

In the present embodiment, the coupling capacitances of any of the sub-pixel with adjacent data lines are equal.

Since a pixel electrode layer is arranged in the sub-pixel and there is a voltage on the pixel electrode layer, there is a coupling voltage between the sub-pixels and the data line to form a coupling capacitance. The coupling capacitance gets greater as the data line gets closer to the sub-pixels. When the coupling capacitance of the sub-pixel and the two adjacent data lines are equal, vertical crosstalk generated by the display panel can be prevented.

In the present embodiment, the spacing between any of the sub-pixels and the two adjacent data lines may be the same.

For example, the spacing between any one of the sub-pixels in the second column and the second sub-data line 105 located between the first and second columns, is identical to the spacing between each of the sub-pixels in the second column and the first sub-data line 104 located between the second and third columns.

When the input voltage of the data lines are equal, with the distances between the sub-pixels and adjacent data lines kept equal, it is beneficial to keep consistent coupling capacitances between the sub-pixel and the two adjacent data lines, so as to avoid vertical crosstalk in the display panel.

Furthermore, with the increase of the size of the display panel, the lengths of the data line and the scanline are extended. Consequently, the impedances of the data lines far away from the data transmission end are increased as the received voltage is decreased, and the received signal may be delayed.

Therefore, the width of the data line may be gradually increased along the direction of the data line far away from the data transmission end, or the resistivity of the data line may be gradually decreased by design along the direction of the data line far away from the data transmission end.

By gradually increasing the width of the data line or decreasing the resistivity along the direction of the data line far away from the data transmission end, the increase of the impedance of the data line in the direction far away from the data transmission end can be slowed down, so that the signal transmission effect can be improved.

Meanwhile, the spacing between the sub-pixels and adjacent data lines can be reduced along the direction of the data line far away from the data transmission end.

By reducing the spacing between the sub-pixels and the adjacent data lines along the direction where the data line is far away from the data transmission end, the coupling capacitance between the sub-pixel and the two adjacent data lines along the direction of the data line far away from the data transmission end is beneficial to maintain display quality when the size of the display panel is increased.

In this embodiment, the display panel can also comprise an output circuit board, and the output circuit board comprises at least two output terminals.

The output terminal can comprise a first sub-output terminal and a second sub-output terminal, the first sub-output terminal can be electrically connected to at least one of the first sub-data lines 104, and the second sub-output terminal can be electrically connected to at least one of the second sub-data lines 105.

For example, one of the first sub-output terminals can be electrically connected to at least two of the first sub-data lines 104, and one of the second sub-output terminals can be electrically connected to at least two of the second sub-data lines 105.

By electrically connecting a plurality of the first sub-data lines 104 with one of the first sub-output terminals and a plurality of the second sub-data lines 105 with one of the second sub-output terminals, the number of the output terminals on the output circuit board is reduced, which is conducive to simplifying the circuit structure of the display panel and reducing the production cost of the display panel.

In this embodiment, the sub-pixels may be red sub-pixels, green sub-pixels, or blue sub-pixels.

The sub-pixels in each row are arranged repeatedly in an order of red, green, and blue. Same arrangement is applicable for the sub-pixels in the column direction.

An embodiment of the display panel provided by the present application allows the sub-pixels of the display panel to maintain gray-levels unchanged in successive frames while the polarities are reversed, so that the polarity symmetricity of the sub-pixels in the display panel is maintained during frame switching, hence the grainy effects of the display panel can be prevented when an image is displayed, and the display quality of the display panel can be improved.

Referring to FIGS. 1 to 4, an embodiment of a driving method is provided for the display panel, comprising the following steps.

A plurality of sub-pixels are arranged in a matrix to form a plurality of cell areas 101 arranged repeatedly in rows and columns. Each of the cell areas 101 comprises at least two sub-pixels. Polarities of adjacent sub-pixels in the cell areas are opposite. For at least two consecutive frames during one display cycle, gray-levels of sub-pixels in each cell area 101 maintain unchanged whereas polarities of sub-pixels in each cell area are changed in successive frames.

In the present embodiment, during one display cycle in a cell area 101, the polarities of the sub-pixels in the first frame are reversed in the second frame. The gray-levels of sub-pixels in the second frame maintain unchanged and are respectively identical to those in the first frame.

Alternatively, during the display cycle in the cell area 101, the polarities of the sub-pixels in the third frame are respectively opposite to polarities of the sub-pixels in the second frame. The gray-levels of the sub-pixels in the third frame maintain unchanged and are respectively identical to those in the second frame.

The scan signal is transmitted to each sub-pixel through a plurality of scanlines, wherein each row of the sub-pixel corresponds to one of the scanlines.

In step S300, transmitting data signals to each sub-pixel through a plurality of data lines, and at least one data line is arranged between the sub-pixels in two adjacent columns.

In this embodiment, data signals are transmitted to each sub-pixel through a plurality of data lines so that the polarities of adjacent sub-pixels in the cell area 101 are opposite.

In the embodiment, the first sub-pixel 102 is electrically connected to the first sub-data line 104, the second sub-pixel 103 is electrically connected to the second sub-data line 105, the first sub-data line 104 and the second sub-data line 105 are alternately arranged in the cell area 101, and the polarities of the first sub-pixel 104 and the second sub-data line 105 are opposite.

In the present embodiment, during one display cycle, the polarity of the first sub-data line 104 is switched in an order of positive, negative, positive, and negative, so that the polarity of the first sub-pixel 102 is also switched in the order of positive, negative, positive, and negative during the display cycle.

During one display cycle, the polarity of the second sub-data line 105 is switched in an order of negative, positive, negative, and positive, so that the polarity of the second sub-pixel 103 is also switched in the order of negative, positive, negative, and positive during the display cycle.

In the embodiment, the first sub-pixels 102 in two adjacent columns can share one same first sub-data line 104, and the second sub-pixels 103 in two adjacent columns can share one same second sub-data line 105.

The driving method of the display panel proposed in the embodiment realizes the polarity symmetricity among the sub-pixels of the display panel during frame switching by maintaining the same gray-levels in at least two consecutive frames while reversing polarities of each sub-pixels during the display cycle. The grainy effects of the displayed image in the display panel is eliminated, and the display quality of the display panel is improved.

The application provides a display panel and a driving method thereof. The display panel comprises a plurality of sub-pixels arranged in a matrix, and the sub-pixel is grouped into a plurality of cell areas arranged repeatedly along the row direction and the column direction, wherein each cell area comprises at least two sub-pixels. A plurality of scanlines are arranged for transmitting scan signals, and each row of sub-pixels is corresponding to a scanline. A plurality of data lines are provided for transmitting data signals, wherein at least one data line is arranged between the adjacent two columns of sub-pixel. In at least two consecutive frames during one display cycle, the gray-levels of sub-pixels in the cell area maintain unchanged, whereas polarities of the sub-pixels are reversed. According to the embodiment, the gray-levels of sub-pixels in the cell area remain the same in at least two consecutive frames during a display cycle, whereas the polarities of the sub-pixels are reversed, so that the polarity of the sub-pixel of the display panel is symmetrical when the frame is switched, thus eliminating the grainy effects of the display panel when displaying the screen, and improving the display quality of the display panel.

It can be understood that for a person of ordinary skill in the art, equivalent replacement or change can be made according to the technical solution of the application and the application concept, and all such changes or substitutions shall fall within the protection scope of the claims attached to the application.

In summary, although the application has disclosed the above with preferred embodiments, the above preferred embodiments are not intended to limit the application. Ordinary technical personnel in the art can make various modifications and refinements without departing from the spirit and scope of the application. Therefore, the scope of protection of the application is subject to the scope defined in the claims.

What is claimed is:

1. A display panel, comprising:

a plurality of sub-pixels arranged in a matrix, wherein the sub-pixels are grouped into a plurality of cell areas arranged repeatedly in rows and columns, each cell area comprises at least a first sub-pixel and at least a second sub-pixel adjacent to the first sub-pixel;

a plurality of scanlines, transmitting scan signals to each sub-pixel, wherein each row of the sub-pixels corresponds to one of the scanlines; and a plurality of data lines, transmitting data signals to each sub-pixel, wherein at least one data line is arranged between two adjacent columns of sub-pixels; wherein:

polarities of adjacent sub-pixels in each cell area are opposite, polarity of each of sub-pixels is positive or negative; and wherein during one display cycle, in each cell area:

a gray-level of the first sub-pixel is switched in an order of high, high, low, and low, the first sub-pixel renders brightness in the first and second frames greater than a first target brightness of the first sub-pixel, and the first sub-pixel renders brightness in the third and fourth frames lower than the first target brightness of the first sub-pixel; and a gray-level of the second sub-pixel is switched in an order of low, low, high, and high, the second sub-pixel renders brightness in the first and second frames lower than a second target display brightness of the second sub-pixel, and the second sub-pixel renders brightness in the third and fourth frames greater than the second target display brightness of the second sub-pixel.

2. The display panel according to claim 1, wherein during one display cycle in each cell area:

polarities of each sub-pixel in a second frame are respectively opposite to polarities of each sub-pixel in a first frame, and gray-levels of each sub-pixel in the second frame are respectively identical to gray-levels of each sub-pixel in the first frame; or polarities of each sub-pixel in the second frame are respectively opposite to polarities of each sub-pixel of a third frame, and gray-levels of each sub-pixel in the second frame are respectively identical to gray-levels of each sub-pixel in the third frame.

3. The display panel according to claim 2, wherein during one display cycle in each cell area:

polarities of each sub-pixel in the third frame are respectively opposite to polarities of each sub-pixel of a fourth frame, and gray-levels of each sub-pixel in the third frame are respectively identical to gray-levels of each sub-pixel in the fourth frame; or gray-levels of each sub-pixel in the fourth frame are respectively identical to gray-levels of each sub-pixel in the first frame.

4. The display panel according to claim 1, wherein the first sub-pixels and the second sub-pixels among the sub-pixels are distributed in rows or columns, and a number of first sub-pixels are respectively identical to a number of second sub-pixels.

5. The display panel according to claim 1, wherein in a cell area:

the data lines comprise first sub-data lines and second sub-data lines;

each of the first sub-pixels is electrically connected to one of the first sub-data lines;

each of the second sub-pixels is electrically connected to one of the second sub-data lines;

the first sub-data lines and the second sub-data lines are alternately arranged; and polarities of the first sub-data lines and the second sub-data lines are opposite.

6. The display panel according to claim 5, wherein in each of the cell areas:

two first sub-pixels in adjacent columns share one first sub-data line; and two second sub-pixels in adjacent columns share one second sub-data line.

7. The display panel according to claim 5, wherein during one display cycle:

a polarity of the first sub-data lines is switched in an order of positive, negative, positive, and negative; and a polarity of the second sub-data lines is switched in an order of negative, positive, negative, and positive.

8. The display panel according to claim 5, wherein:

the display panel further comprises an output circuit board, and the output circuit board comprises at least two output terminals;

the output terminal comprises a first sub-output terminal and a second sub-output terminal;

the first sub-output terminal is electrically connected to at east one first sub-data line; and the second sub-output terminal is electrically connected to at least one second sub-data line.

9. The display panel according to claim 2, wherein a refresh rate of a displayed image on the display panel is greater than or equal to 240 Hz.

10. The display panel according to claim 1, wherein colors of the sub-pixels comprise red, green, and blue;

the sub-pixels are repeatedly arranged in each row in an order of red, green, and blue; and sub-pixels in the same column are of the same color.

11. A driving method for display panel, wherein the display panel comprises a plurality of sub-pixels arranged in a matrix to form a plurality of cell areas arranged repeatedly in rows and columns; each of the cell area comprises at least a first sub-pixel and at least a second sub-pixel adjacent to the first sub-pixel; and the driving method comprising:

transmitting scan signals to each sub-pixel through a plurality of scanlines, wherein each row of the sub-pixel corresponds to one of the scanlines; and transmitting data signals to each sub-pixel through a plurality of data lines; wherein at least one data line is arranged between sub-pixels in two adjacent columns, so as to maintain polarities of adjacent sub-pixels in the cell areas being opposite, and wherein during one display cycle, in each cell area:

a gray-level of the first sub-pixel is switched in an order of high, high, low, and low, the first sub-pixel renders brightness in the first and second frames greater than a first target brightness of the first sub-pixel, and the first sub-pixel renders brightness in the third and fourth frames lower than the first target brightness of the first sub-pixel; and a gray-level of the second sub-pixel is switched in an order of low, low, high, and high, the second sub-pixel renders brightness in the first and second frames lower than a second target display brightness of the second sub-pixel, and the second sub-pixel renders brightness in the third and fourth frames greater than the second target display brightness of the second sub-pixel; or wherein during one display cycle, in each cell area:

a gray-level of the first sub-pixel is switched in an order of high, low, low, and high, the first sub-pixel renders brightness in the first and fourth frames greater than a first target display brightness of the first sub-pixel and the first sub-pixel renders brightness in the second and third frames less than the first target display brightness of the first sub-pixel; and a gray-level of the second sub-pixel is switched in an order of low, high, high, and low, the second sub-pixel renders brightness in the first and fourth frames lower than a second target display brightness of the second sub-pixel, and the second sub-pixel renders brightness in the second and third frames greater than the second target display brightness of the second sub-pixel.

12. The driving method of the display panel according to claim 11, wherein during one display cycle in each cell area:

polarities of each sub-pixel in a second frame are respectively opposite to polarities of each sub-pixel in a first frame; and gray-levels of each sub-pixel in the second frame are respectively identical to gray-levels of each sub-pixel in the first frame; or polarities of each sub-pixel in the second frame are respectively opposite to polarities of each sub-pixel of a third frame, and gray-levels of each sub-pixel in the second frame are respectively identical to gray-levels of each sub-pixel in the third frame.

13. The driving method of the display panel according to claim 11, wherein in each cell area:

a first sub-pixel and a second sub-pixel adjacent to the first sub-pixel are arranged in each cell area:

the first sub-pixel is electrically connected to a first sub-data line;

the second sub-pixel is electrically connected to a second sub-data line;

the first sub-data line and the second sub-data line are alternately arranged; and polarities of the first sub-data line and the second sub-data line are opposite.

14. The driving method of the display panel according to claim 13, wherein during one display cycle, the driving method further comprises:

switching a polarity of the first sub-data line in an order of positive, negative, positive, and negative, so that a polarity of the first sub-pixel is switched in the order of positive, negative, positive, and negative; and switching a polarity of the second sub-data line in an order of negative, positive, negative, and positive, so that a polarity of the second sub-pixel is switched in the order of negative, positive, negative, and positive.

15. The driving method of the display panel according to claim 13, wherein in each of the cell areas:

two first sub-pixels in adjacent columns share one first sub-data line; and two second sub-pixels in adjacent columns share one second sub-data line.

16. A display panel, comprising:

a plurality of sub-pixels arranged in a matrix, wherein the sub-pixels are grouped into a plurality of cell areas arranged repeatedly in rows and columns, each cell area comprises at least a first sub-pixel and at least a second sub-pixel adjacent to the first sub-pixel;

a plurality of scanlines, transmitting scan signals to each sub-pixel, wherein each row of the sub-pixels corresponds to one of the scanlines; and a plurality of data lines, transmitting data signals to each sub-pixel, wherein at least one data line is arranged between two adjacent columns of sub-pixels; wherein:

polarities of adjacent sub-pixels in each cell area are opposite, polarity of each of sub-pixels is positive or negative; and wherein during one display cycle, in each cell area:

a gray-level of the first sub-pixel is switched in an order of high, low, low, and high, the first sub-pixel renders brightness in the first and fourth frames greater than a first target display brightness of the first sub-pixel, and the first sub-pixel renders brightness in the second and third frames less than the first target display brightness of the first sub-pixel; and a gray-level of the second sub-pixel is switched in an order of low, high, high, and low, the second sub-pixel renders brightness in the first and fourth frames lower than a second target display brightness of the second sub-pixel, and the second sub-pixel renders brightness in the second and third frames greater than the second target display brightness of the second sub-pixel.

* * * * *